United States Patent
Schmidt

(10) Patent No.: US 10,611,062 B2
(45) Date of Patent: Apr. 7, 2020

(54) ROTARY INDEXING PRESS

(71) Applicant: Bleistahl-Produktions GmbH & Co. KG, Wetter (DE)

(72) Inventor: Holger Schmidt, Wuppertal (DE)

(73) Assignee: Bleistahl-Produktions GmbH & Co. KG, Wetter (DE)

( * ) Notice: Subject to any disclaimer, the term of this patent is extended or adjusted under 35 U.S.C. 154(b) by 179 days.

(21) Appl. No.: 14/403,457

(22) PCT Filed: May 27, 2013

(86) PCT No.: PCT/EP2013/060856
§ 371 (c)(1),
(2) Date: Nov. 24, 2014

(87) PCT Pub. No.: WO2013/175017
PCT Pub. Date: Nov. 28, 2013

(65) Prior Publication Data
US 2015/0174796 A1    Jun. 25, 2015

(30) Foreign Application Priority Data
May 25, 2012 (DE) .................. 10 2012 010 263

(51) Int. Cl.
*B29C 43/04* (2006.01)
*B30B 11/10* (2006.01)
*B30B 15/02* (2006.01)
*B29L 31/00* (2006.01)

(52) U.S. Cl.
CPC ............. *B29C 43/04* (2013.01); *B30B 11/10* (2013.01); *B30B 15/026* (2013.01); *B30B 15/028* (2013.01); *B29C 2043/043* (2013.01); *B29L 2031/7728* (2013.01)

(58) Field of Classification Search
None
See application file for complete search history.

(56) References Cited

U.S. PATENT DOCUMENTS

| | | | | |
|---|---|---|---|---|
| 2,449,008 A | * | 9/1948 | Pecker | B22F 3/03 425/344 |
| 5,686,118 A | * | 11/1997 | Kurata | B30B 11/08 425/122 |
| 7,122,143 B2 | * | 10/2006 | Sowden | A23G 3/04 264/271.1 |

FOREIGN PATENT DOCUMENTS

GB        1443510     *  4/1975

* cited by examiner

*Primary Examiner* — Edmund H Lee
(74) *Attorney, Agent, or Firm* — Brooks Kushman P.C.

(57) ABSTRACT

The invention relates to a rotary indexing press for the production of green compacts from powder substances. The rotary indexing press is provided with an indexing plate equipped with a plurality of tool cavities assigned to a plurality of tool positions, with said tool positions being at a minimum used for the filling, compacting, and ejecting of workpieces, and with at least one cavity being assigned to each tool position, and wherein the indexing plate having a form-closed and/or force-dosed connection with the body of the machine during compacting. The invention moreover relates to a method for the production of green compacts from powder materials using a rotary indexing press.

12 Claims, 3 Drawing Sheets

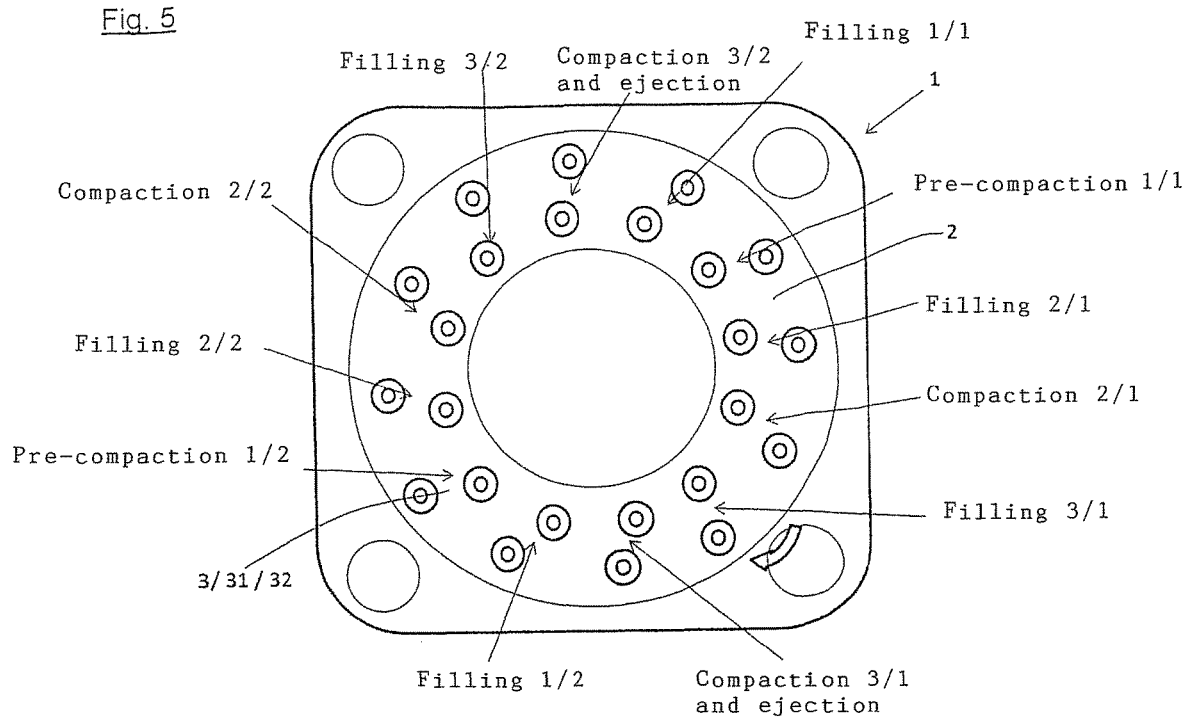

ROTARY INDEXING PRESS

Figure 1:
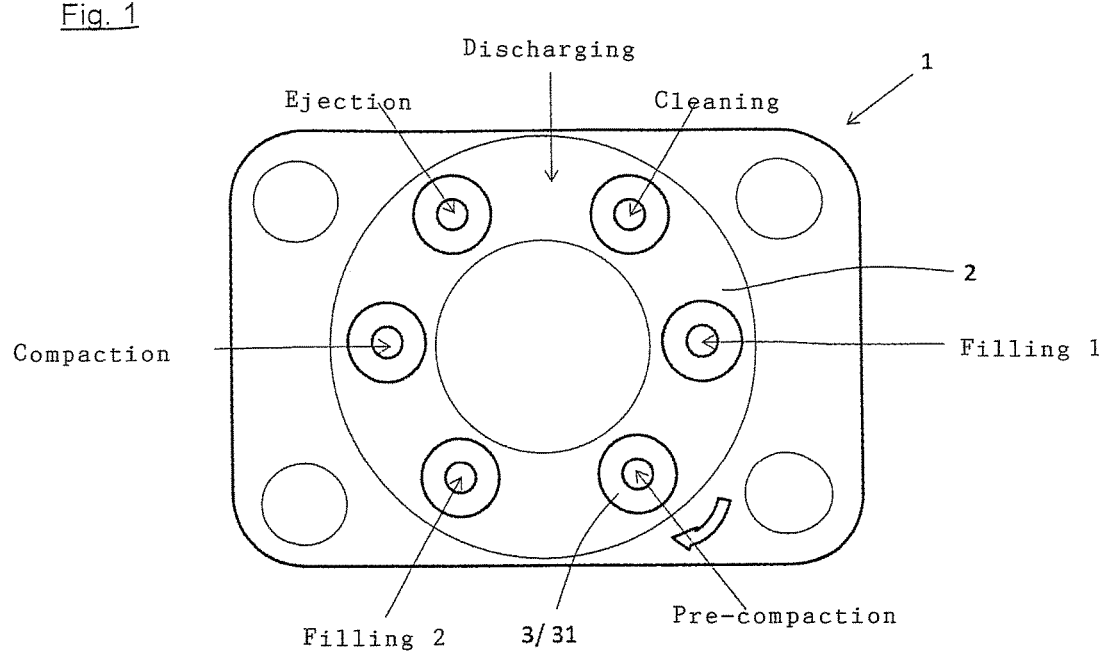

The invention relates to a rotary indexing press comprising several processing stations for the simultaneous execution of work steps basically taking place one after the other, especially for the production of green compacts made of powder materials. The rotary indexing press may in particular be employed for the manufacture of valve seat rings and valve guiding components.

Rotary indexing presses of the kind mentioned above have been disclosed in EP 1 064 119 A1 for example. By the term rotary indexing press a machine tool is to be understood which is equipped with an indexing plate rotating around a vertical axis and a plurality of processing stations being arranged on said indexing plate. Each processing station is provided with at least one clamping device used to properly secure the workplace. Arranged along the circumference of the rotary table are several stationary processing stations by means of which the workpieces are processed which are carried on the satellites. For multiple processing of the workpieces the rotary table is turned stepwise from one working position to the next, whereby the workpieces arranged on the rotary table are transferred step by step from one processing station to the next where each of the workpieces is processed by means of one or several stationary processing units.

Generally, rotary indexing machinery with vertically or horizontally arranged indexing plates are known for use as assembly, processing or testing equipment to enable assembly or testing tasks to be performed simultaneously and with identical workpieces in parallel via several processing stations. The cycle time is determined by the station that needs the longest workpiece processing time.

In principle, the prior art rotary indexing machines offer advantages in that multiple processing of workpieces is possible by means of a single indexing plate using a plurality of processing units.

Nevertheless, prior art rotary indexing machines are also associated with the disadvantage that they are unsuited for pressing duty because loads exerted through high pressing forces would damage the indexing plate supporting system. For the production of valve seat rings and valve guides consisting of powder material press forces in excess of 700 kN are needed.

Therefore, it is the objective of the present invention to provide a rotary indexing press suitable for the production of high-quality green compacts of the same kind, said press offering a production rate that is higher than can be achieved with conventional pressing equipment featuring stationary die and tool plane plates. Moreover, the rotary indexing press shall be suited for multiple filling as well as multiple compacting even when different powdery substances are used. In this context, the pressing operation shall not exert loads on the indexing plate supporting system.

To achieve this objective and proceeding from a rotary indexing machine of the kind first mentioned above the present invention proposes that the rotary indexing press is provided with an indexing plate equipped with a plurality of tool cavities assigned to a plurality of tool positions, with said tool positions being at a minimum used for the filling, compacting, and ejecting of workpieces, and with at least one cavity being assigned to each tool position, and wherein the indexing plate having a form-closed and/or force-closed connection with the body of the machine during compacting.

Surprisingly, it has become evident that the application of a rotary indexing press for the production of green compacts leads to energy savings that are not to be regarded as insignificant in comparison with customary pressing methods. Moreover, due to the stationary arrangement of the tools shorter tool travel distances are brought about resulting in a rationalization of the manufacturing process.

Each tool cavity is meant for the production of one green compact each. In the manufacturing process the workpieces to be produced pass through various tool positions, for example for filling, pre-compaction, re-filling, compaction, ejection, discharging, and cleaning. To prevent the indexing plate supporting system from suffering damage the plate is connected to the machine body in a form-closed and/or force-closed manner during compaction. In this way the compacting step does not cause damage to the indexing plate since the total load acting on the indexing plate is absorbed by the body of the press.

The present invention proposes that the tool cavities in the indexing plate are provided in the form of replaceable dies which allows the production process to be easily and quickly changed to manufacture other articles.

A preferred embodiment of the rotary indexing press provides for the indexing plate in each case to be equipped with several dies on each indexing position with pertinent tools for filling, compacting, ejecting, and removing resp. discharging operations. This enables a plurality of green compacts to be produced. Since the cycle times that apply to the green compacts are linked to the processing stations it is advisable to make use of several dies and pertinent tools to save manufacturing time.

The rotary indexing press is characterized by a design that enables the machine to be provided via the indexing plate with equipment at a minimum for filling, compacting, ejecting, discharging or removing of the compaction products it manufactures. A tool cavity can be filled several times with powder substances of similar or different nature with compaction taking place repeatedly. The filling operation may be performed by suction, dropping or dosing. Manufacturing infiltration parts separately can be omitted. This enables the complete manufacture of a green compact by means of a single machine. Since all the required manufacturing steps are carried out via the rotary indexing press additional machines/equipment will not be needed. This brings down costs because there is no need to purchase additional machinery.

The design of the rotary indexing press provides for lower tools being arranged on the underside of the indexing plate on movement planes, said tools being moved within the processing stations by means of force-distance devices. The force-distance devices are CNC controlled and may be operated hydraulically, electromechanically, electrohydrostatically or a by a combination of these options. This makes it possible to use the lower tools precisely in combination with and as required by the upper tools. Compaction may take place with respect to height or density (travel or force), from below, from above, by two-sided or proportional compaction so that the varying requirements of the compaction products can be satisfied.

The rotary indexing press has two or more lower punches as well as two or more upper punches which can be controlled separately which enables them to be moved independently of another.

Moreover, the movement planes of the lower tools of the indexing plate can be arrested in resting position while the indexing plate performs an indexing step. In this way the position of the lower tools cannot be changed while the indexing step is carried out, and this is necessary to enable the force-distance device of the following station to correctly operate.

Moreover, the invention proposes that the movements of the upper and lower punches of the compaction tools are freely programmable without fixed mechanical stops. This improves variability and broadens the application range of the rotary indexing press according to the invention, particularly also with respect to the filling height of the cavities.

An especially preferred embodiment of the rotary indexing press comprises filling devices designed for a multiple filling of a cavity. Said filling devices can be employed to produce multilayered green compacts. This may be of special advantage if the green compact which is to be sintered later on must possess properties deviating from each other at different positions. If there are places in the green compact that do not have to satisfy demanding requirements more cost-efficient materials may be used here.

Additionally, it is proposed that the rotary indexing press comprises tools for pre-compaction and for at least one final compaction step. The pre-compaction step would be provided in case the above mentioned multiple filling method is adopted. This enables the different material layers to be pre-compacted by means of differently shaped upper punches so that varying requirements can be met. As soon as the last filling step has been completed the final compaction step is carried out.

An advantageous embodiment of the rotary indexing press provides for the force-distance devices of the upper and lower punches of the compaction tool to be equipped with a measuring system. This enables detection and compensation of the punch deflection and resilience during the compaction and relief process. In this manner, high dimensional precision of the green compacts is achieved.

Another positive design of the rotary indexing press provides for a quick-action clamping device to be used with the indexing plate which enables said indexing plate and the associated tools to be advantageously set up external to the machine. This will significantly reduce set-up downtimes of this press in view of and comparison to the more extensive set-up work that a conventional powder press requires.

Moreover, the invention relates to a process for the production of green compacts from powder substances by means of a rotary indexing press, wherein cavities are filled with the powder material, the powder materials are compacted, and the green compacts obtained from the powder material are ejected. The individual work steps are carried out by means of using an indexing plate provided with a plurality of cavities serving as dies, and wherein the filling, compacting, and ejecting steps are taking place simultaneously via a variety of processing stations, and with the indexing plate being connected to the machine body during the compaction process in a form-closed and/or force-closed manner. Combining the above mentioned features makes it possible for the first time ever to manufacture green compacts by means of a rotary indexing press. The problem that the indexing plate could hitherto not be employed for this is resolved by providing the form- and/or force-closed connection with the machine body.

A variant of the method proposes that the overall process takes place in parallel via a plurality of processing stations, wherein each processing station is equipped with several cavities for the same processing step. The increased number of cavities in the simultaneously operated processing stations allows for a significantly higher production rate than could be achieved up to now.

A preferred embodiment of the method provides for the individual cavities to be repeatedly filled with powder material which is compacted subsequently. In this way, the desired properties of the sintered products can be purposefully achieved. For example, materials having different thermal conductivity or wear resistance characteristics can be employed. This may be necessary to meet the application needs of the sintered product. Moreover, in areas where only minor stresses arise more cost-efficient materials can be employed than in critical areas of the sintered product, for example of a valve seat ring or a valve guiding element.

A preferred embodiment of the method provides for one and the same cavity to be again filled and compacted after the first filling and compaction step has taken place. In this manner, special geometries of the individual layers of the powder substances can be accomplished as may be necessary to respond to the demands the sintered product must fulfill. In this case as well materials of different characteristics can be used to satisfy the requirements of the sintered product.

A particularly preferred embodiment of the method provides for a plurality of green compacts to be manufactured simultaneously. Manufacturing several green compacts at the same time results in the production rate to be increased and thus optimizes the payback period of the rotary indexing press. It goes without saying that an increased production rate has especially beneficial effects on the profitability of a product.

A considerable advantage of the method is that the filling, compaction, and ejection steps are performed simultaneously at a plurality of processing stations. Therefore, after the first cycle has been gone through at least one green compact will have been manufactured at every processing station when the indexing plate has moved by one indexing position. In this way, a high production rate is achieved.

The invention is particularly suitable for green compacts of valve guides and valve seat rings manufactured with a rotary indexing press or a method according to the preceding claim. Valve seat rings are nowadays manufactured by powder metallurgical processes and adopting a two-layer design. By additional filling and compaction, for example using infiltrating powders, the manufacture of green infiltrants as well as the process of bringing both components together can be dispensed with. A high production rate is desirable and can be accomplished by the measures described hereinbefore.

Figure 2:
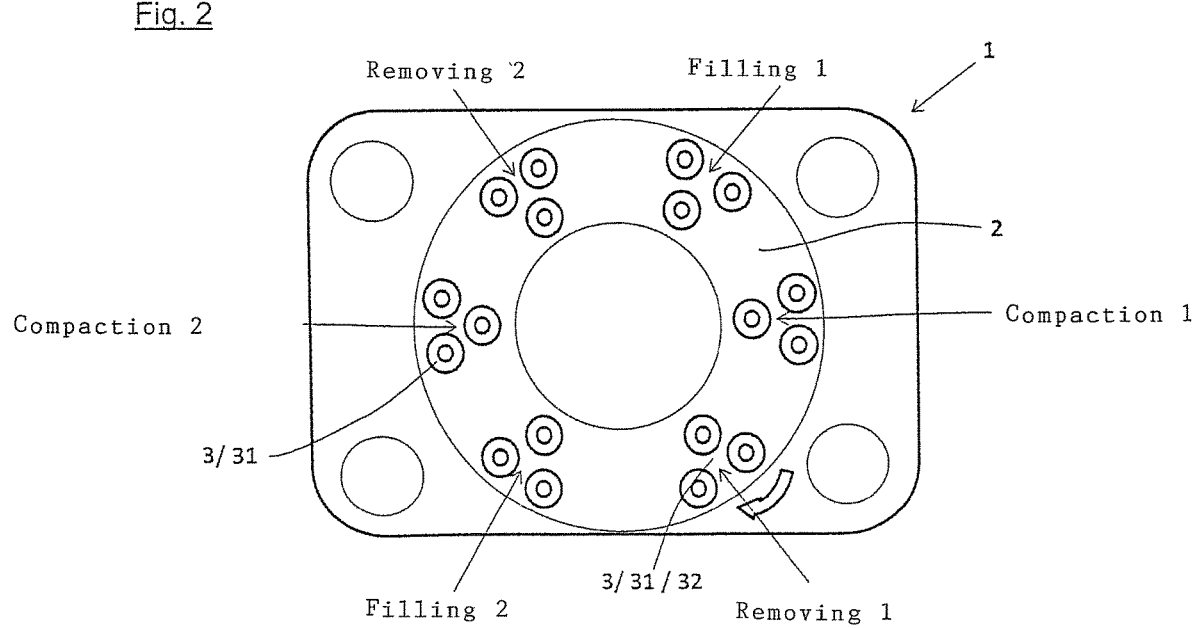
Figure 3:
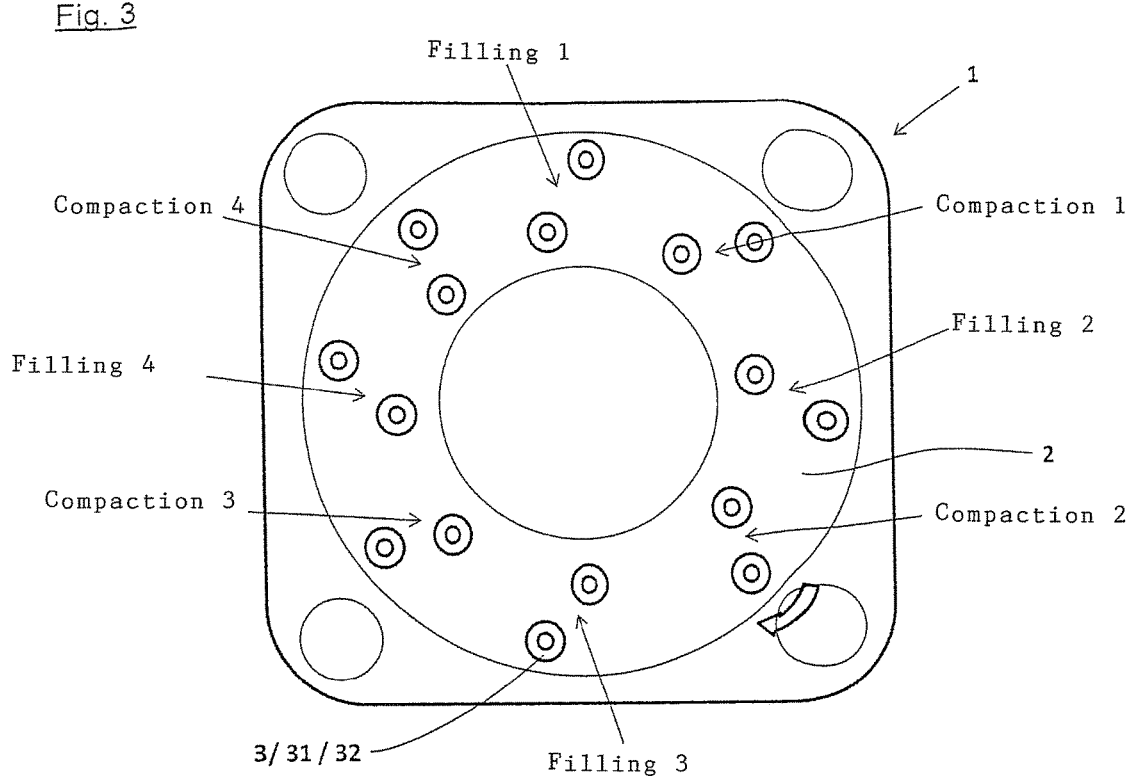
Figure 4:
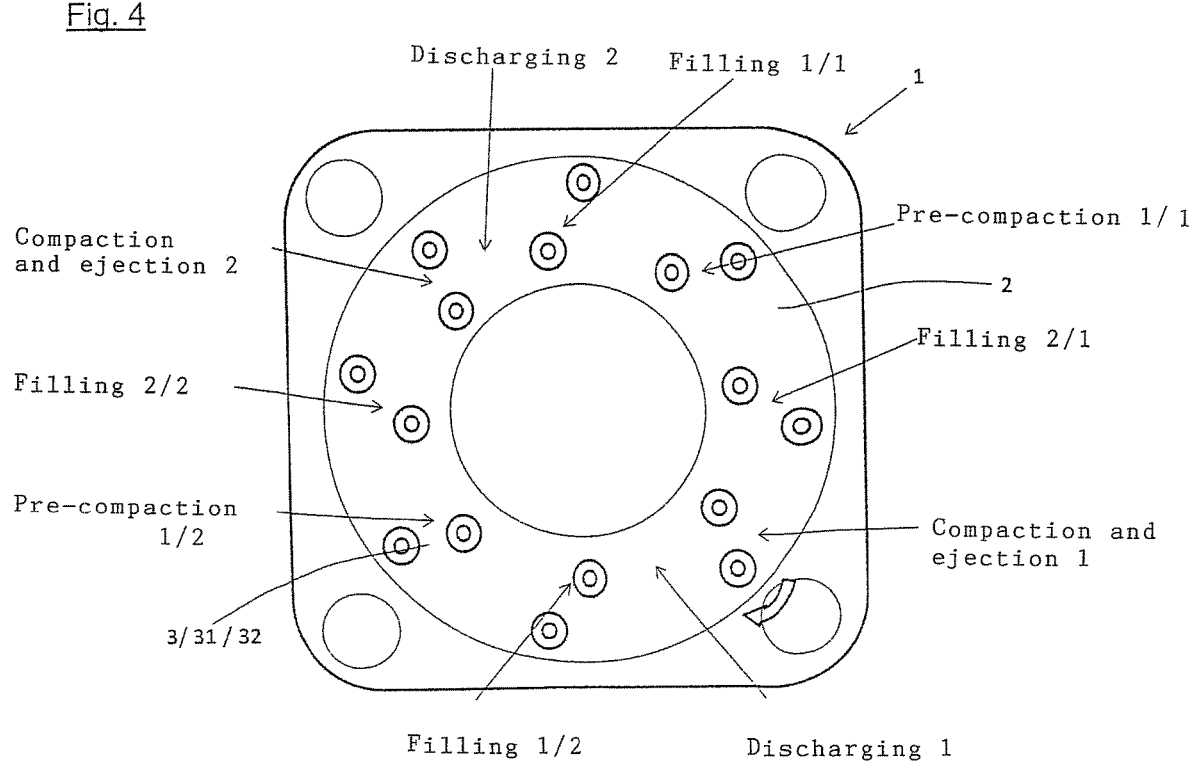

Exemplary embodiments of the invention are illustrated by way of the following drawings where FIG. 1 is a schematic representation of the indexing plate featuring: Two-stage filling, two-stage compaction with single tool cavity, FIG. 2 illustrates a schematic representation of an indexing plate featuring: One-stage filling, one-stage compaction with multiple tool cavity, double use, FIG. 3 illustrates a schematic representation of an indexing plate featuring: One-stage filling, one-stage compaction with double tool cavity, four-fold use, FIG. 4 is a schematic representation of an indexing plate featuring: Two-stage filling, two-stage compaction with double tool cavity, double use, FIG. 5 is a schematic representation of an indexing plate featuring: Three-stage filling, three-stage compaction with double tool cavity, double use, In FIGS. 1 through 5 a rotary indexing press 1 can be seen on which an indexing plate 2 is arranged, said plate being provided with a plurality of processing stations 3 as well as dies and tool punch 31 of which, for the sake of clarity, only one element has been identified by a reference numeral. In the illustrated Figures the indexing plate 2 of the rotary indexing press 1 always moves clockwise. FIGS. 2 through 5 additionally show multiple tool cavities 32.

In FIG. 1 a two-stage filling with two-stage compaction process is shown utilizing a single tool cavity. Multiple filling enables different materials to be used which is especially favorable with respect to the properties of the workpiece. Following the final compaction step the workpiece is ejected and discharged. Subsequently, processing station 3 as well as the dies and tool punch 31 are cleaned. With every indexing cycle of the indexing plate 2 a green compact is manufactured.

In FIG. 2 a one-stage filling as well as a one-stage compaction process is shown with a multiple tool cavity 32 which in this case is a three-fold tool cavity 32. In this example the indexing plate 2 of the rotary indexing press 1 is designed for double production use which means every indexing cycle of the indexing plate enables six green compacts to be manufactured.

In FIG. 3 one-stage filling with one-stage compaction is illustrated with double tool cavity 32; in this case, however, the design provides for a four-fold production use. This means every indexing cycle of the indexing plate 2 of the rotary indexing press 1 results in a total of eight green compacts to be manufactured.

FIG. 4 depicts a two-stage filling with two-stage compaction process with double tool cavity 32 being provided; the system is designed for double use. The process starts with filling the first processing station 3 for the first workpiece. Subsequently, the first workpiece is pre-compacted and a second filling operation performed after which the first workpiece is finally compacted and then discharged. After this workpiece has been discharged filling the second processing station for the second green compact starts. In this case as well a first filling, pre-compaction, and a second filling operation takes place following which the workpiece is finally compacted, then ejected and ultimately the completed green compact is discharged. In other words, a step by step process is provided. With every indexing cycle of the indexing plate a total of four green compacts are produced.

FIG. 5 coincides with the design principle depicted in FIG. 4, wherein in this case a three-stage filling as well as three-stage compaction process is provided. Due to the double tool cavity and the two-fold production use a total of four green compacts are manufactured with every indexing cycle performed by indexing plate 2 of rotary indexing press 1.

A rotary indexing press with indexing plate as proposed by the invention mainly differs from a rotary transfer press of customary design in that it is provided with more than one upper punch and more than one lower punch which can each be separately controlled and moved independently of one another. This allows high pressing forces to be exerted because the indexing plate is supported via the machine arm during the pressing operation. The variability enables great filling heights to be achieved that can be precisely tailored to the relevant product, for example valve guide elements. Multi-layer filling can easily be accomplished and each filling layer separately preformed as required and then pre-compacted or finally compacted. Separate tools adapted to suit the respective form can be employed and individual pressing forces applied as necessary. Over the plate circumference the tools arranged on the indexing plate can be provided for single or multiple use.

The invention claimed is:

1. Rotary indexing press designed to compact metal powder, comprising a plurality of processing stations (3) for the simultaneous execution of work steps taking place one after the other, wherein the rotary indexing press (1) is provided with an indexing plate (2) that can be rotated step by step with respect to the body of the press but has a direct form-closed and/or force-closed connection with, and placing a load on, the body of the press only during compaction whereby to prevent damage to the indexing plate, the load acting on the indexing plate being absorbed by the body of the press, the indexing plate (2) being equipped with a plurality of tool cavities (31) assigned to a plurality of tool positions, with said tool positions being at a minimum used for a first filling, pre-compacting, second filling, compacting and ejecting of work pieces, the filing, compacting and ejecting steps taking place simultaneously via a variety of processing stations, and wherein the indexing plate (2) has a form closed and/or force closed connection with the body of the press during compacting and each processing station is equipped with several cavities for the same processing step.

2. Rotary indexing press according to claim 1, characterized in that the tool cavities (31) are provided in the form of dies.

3. Rotary indexing press according to claim 2, characterized in that the indexing plate (2) is provided with a plurality of dies and tools for filling, compaction, and ejection.

4. Rotary indexing press according to claim 1, characterized in that the press via the indexing plate (2) is provided with equipment that at a minimum enables filling, compaction, and ejection of the compaction products it manufactures.

5. Rotary indexing press according to claim 4, characterized in that lower tools are arranged on the underside of the indexing plate (2), said tools being moved within the processing stations (3) by means of force-distance devices.

6. Rotary indexing press according to claim 5, characterized by arresting means for the lower tools in resting position while the indexing plate (2) performs an indexing step.

7. Rotary indexing press according to claim 5, characterized in that the movements of the upper and lower tools of the compaction tools are freely programmable in any position.

8. Rotary indexing press according to claim 1, characterized in that the press is provided with filling equipment for multiple filling of a cavity.

9. Rotary indexing press according to claim 8, characterized in that the press comprises tools for a pre-compaction and for at least one final compaction step.

10. Rotary indexing press according to claim 1, characterized by force-distance measuring equipment for the upper and lower punches of the compaction tool for compensation of the punch deflection and resilience during the compaction and relief process.

11. Rotary indexing press according to claim 1, characterized by a quick-action clamping device for the indexing plate which enables said indexing plate and the associated tools to be set up external to the press.

12. Rotary indexing press according to claim 1 for the production of green compacts made of powder substances.

* * * * *